(12) United States Patent
Sulzer

(10) Patent No.: US 6,828,027 B1
(45) Date of Patent: Dec. 7, 2004

(54) FIRE-RESISTANT COATED BUILDING PANELS

(75) Inventor: Hans-Dietrich Sulzer, Herrliberg (CH)

(73) Assignee: BASWAacoustic AG, Baldegg (CH)

( * ) Notice: Subject to any disclaimer, the term of this patent is extended or adjusted under 35 U.S.C. 154(b) by 0 days.

(21) Appl. No.: 10/449,086

(22) Filed: Jun. 2, 2003

(51) Int. Cl.[7] ................................................. B32B 5/16
(52) U.S. Cl. ........................ 428/406; 428/220; 428/323; 428/361; 428/372; 428/387; 428/402; 428/407; 427/220; 427/215; 427/372.2
(58) Field of Search .............................. 428/220, 317.1, 428/323, 332, 361, 372, 375, 387, 391, 402, 406, 407; 427/220, 215, 372.2; 52/226, 220.1, 454

(56) References Cited

U.S. PATENT DOCUMENTS

| | | |
|---|---|---|
| 2,244,325 A | 6/1941 | Bird |
| 2,726,216 A | 12/1955 | Kimberlin, Jr. |
| 4,002,590 A | 1/1977 | Yoshida et al. |
| 4,059,553 A | 11/1977 | Tohyama |
| 4,979,992 A * | 12/1990 | Bache ........................ 106/644 |
| 5,053,362 A * | 10/1991 | Chi et al. ................... 501/95.1 |
| 5,389,716 A * | 2/1995 | Graves ....................... 524/510 |
| 5,964,693 A | 10/1999 | Brekau et al. |

FOREIGN PATENT DOCUMENTS

DE 196 14 296 C2 8/2000

* cited by examiner

*Primary Examiner*—Merrick Dixon
(74) *Attorney, Agent, or Firm*—Harness, Dickey & Pierce, P.L.C.

(57) ABSTRACT

In order to reduce the heat transfer coefficient of coated building panels, the coating and the building panel have a high voidage. This high voidage can be obtained by using a fiber mat and a porous coating applied to the fiber mat. The porous coating includes porous glass particles and a low amount of a binder. The porous glass particles are held together by binder bridges, including a silicate binder and a low amount of an organic dispersion binder, for example an polymeric styrol acrylate. The partial volume filled by the binder bridges is small and therefore there is a remarkable first empty partial volume in between the porous particles. A second empty partial volume is located within the glass particles. The total volume of all pores of the glass particles is a relevant part of the total coating volume. This second empty partial volume is a very good thermal isolation because the individual pores are small and to a high percentage closed chambers not connected to the ambient. The silica binder and the high voidage in the coating provide a high fire-resistance.

25 Claims, No Drawings

FIRE-RESISTANT COATED BUILDING PANELS

FIELD OF THE INVENTION

The present invention generally relates to fire-resistant coated building panels.

BACKGROUND OF THE INVENTION

German Patent DE 196 14 296 C2 describes a wall element with a fiber mat and a coating including particles in the form of quartz sand and a binder. In the coating material there are two different particle contributions. A main part of the particles shows a narrow variation in size and a second part has a small size below 0,1 mm. The particles are bonded by organic resin, wherein preferably two different resin dispersions can be used, an acrylic resin or a polymeric dispersion. The binder together with the small sized particles is building slightly elastic bridges between the bigger sized particles. The disadvantage of this coating is the fact, that the resin is not fire-resistant.

A coating composition containing a binder composed mainly of silica gel has been proposed for example in U.S. Pat. No. 4,059,553. For gel formation quarternary ammonium with alkyl groups and hydroxyalkyl groups, each containing from 1 to 20 carbon atoms, are added. In the examples quarternary ammonium is occurring in the form of monomethyltripropanolammonium, dimethyldipropanolammonium, monomethyltriethanolammonium or tetraethanolammonium. Due to the organic alkyl groups this binder has not the required fire-resistance. There are different silica based binders described for example in the patents U.S. Pat. No. 2,244,325, U.S. Pat. No. 2,726,216, and U.S. Pat. No. 5,964,693 but there is no coating mass described with these binders.

U.S. Pat. No. 4,002,590 describes a coating composition with a colloidal silica and an organic polymer in a low content by weight. The binder, consisting of a colloidal silica and an organic polymer, is rather fire resistant because of the low content of organic polymer. A main constituent of the coating composition is a powder of silica and calcium carbonate. The resulting coating has a high density. According to U.S. Pat. No. 4,002,590 it can be applied to concrete surfaces, slate board, calcium silicate board, gypsum board, plywood board or metal plate. It turned out that the heat is transferred very easily by this coating. In the case of fire the heat reaches very fast the board on which the coating is fixed. Therefore the coating does not prevent the board or underlying building material from burning within a short time.

SUMMARY OF THE INVENTION

In view of the foregoing, an object of at least one embodiment of the invention is to provide coated building panels with high fire-resistance and low heat transfer coefficients.

Another object of at least one embodiment of the invention is to provide coated building panels which can be easily produced and mounted.

Another object of at least one embodiment of the invention is to provide coated building panels which can be used for esthetically decorating the ceiling and or walls of rooms.

DETAILED DESCRIPTION OF THE PREFERRED EMBODIMENTS

The present invention generally relates to fire-resistant coated building panels. The walls and ceilings of buildings can include building panels, which are fixed to frames or solid walls respectively ceilings. A panel includes a board element for example a cardboard element or a fiber mat with two main surfaces and a coating on one of the main surfaces.

The coated panel has to fulfill aesthetic and security needs. When mounted, it has to show a pleasant surface and in case of fire, it should not burn. There are fiber mats with very high fire resistance. These fiber mats consist for example of mineral, stone or glass fibers and of binders holding the fibers in the form of a mat. The binder in the mat is preferably fire-resistant.

The mats are preferably pre-coated at a production place where an efficient coating method can be used. The coating has to hold on the surface of the mat and it should not get cracks during handling of the coated mats. A preferred coating material consists of particles and a binder, wherein said binder is building bridges between the particles and to the fiber mat. After mounting pre-coated mats on a wall or ceiling a thin layer of coating can be applied to the coated surface of the pre-coated mats. This final coating layer is a finish rendering which covers the seams between individual fiber mats.

In order to reduce the heat transfer coefficient of coated building panels, at least a coating of the building panel has a high voidage, wherein voidage is the void volume in relation to the total volume. The expression voidage is well knownknown in the context of bulk goods. Looking at a total volume filled with bulk goods, one can distinguish a first partial volume being the sum of all the particle volumes and a second partial volume filled by air. The relation between the second partial volume and the total volume is the voidage of the respective bulk good. Hollow particles or particles with pores have no particle material in the hollow space and in the space of the pores. This inner empty volume can be void or filled with air and it belongs to the second partial volume. In the case of a building panel, the voidage is the relation of the second partial volume to the total volume and therefore of the sum of all partial volumes with no solid material to the total volume looked at. The voidage can be defined for the total panel or for individual layers of the panel. A coating layer with a high voidage has at least a voidage of 50%. With porous particles one can get a coating layer with a high voidage. A fiber mat has also an encreased-increased voidage. Therefore it is advantages to combine a fiber mat with a porous coating applied to the fiber mat. The porous coating includes preferably porous particles and a low amount of a binder. The porous particles can be glass particles or other mineral particles.

Besides the porosity and the small specific weight the particles should preferably have a white color. Tobermorite is an example of a mineral filler which can be produced in the form of porous particles of white color.

In the coating layer the porous particles are held together by binder bridges, including a silicate binder and a low amount of an organic dispersion binder, for example an polymeric styrol acrylate. The partial volume filled by the binder bridges is small and therefore there is a remarkable first empty partial volume in between the porous particles. This first empty partial volume is a system of partially interconnected pores. Due to the thickness of the coating layer and the small diameters as well as the complex geometry of the interconnected pores the transfer of hot air through the coating is limited. Even a small exchange of air would need a very high pressure difference through the coating. Such a high pressure difference is in most cases not possible since the coated building panels are normally fixed adjacent to a solid wall.

A second empty partial volume is located within the porous particles. The total volume of all pores of the particles is a relevant part of the total coating volume. This second empty partial volume is a very good thermal isolation because the individual pores are small and to a high percentage closed chambers not connected to the ambient. There is almost no exchange of air from and to the second empty partial volume. A preferred porous glass product is known under the brand name "poraver".

The preferred porous glass particles have a spherical shape and they are produced from glass powder, water, binder and a blowing agent by a blowing process at a temperature of 900° C. The spherical shape of the particles is achieved by turning granulating plates. By sieving the porous glass spheres a narrow size range can be selected. The preferred porous glass spheres have diameters in the range of 0,5 to 1 mm. The bulk density of the porous glass granulate with spheres of diameters in the range of 0,5 to 1 mm lies in the range of 200 to 300 kg/m$^3$ and preferably amounts to 260 kg/m$^3$. It decreases with increasing sphere diameter. The pH-value is in the range of 2 to 12, the thermal conductivity of a granulate of the porous glass spheres lies in the range of 0.05 to 0.09W/mK and preferably amounts to about 0.07W/mK. The porous glass spheres are very light, pressure resistant, chemically stable, weather resistant, alkali-proof, non flammable, vermin and fungus-proof, of white color and provide a high thermal insulation.

A particulate material with Tobermorit (5CaO 6SiO$_2$ 5H$_2$O) particles has the brand name CIRCOSIL. Tests with CIRCOSIL showed very good results. Tobermorit compounds can be produced synthetically. It is an industrial mineral produced from the natural raw materials limestone and quartz powder using a special hydrothermal process. By using extremely pure raw materials and by implementing optimum processing procedures, it is possible to create ideal porous and crystal structures. Circosil is thermally stable up to temperatures of 750° C. The diameter of the particles can be selected out of a range of 0,1 to 3 mm. Other porous calcium silicate hydrate particles can be produced with the characteristics needed for the coating of the inventive building panels. By hydro thermally processing silica starting material, granulating and screening the emerging particles one can produce porous particles with appropriate diameter and shape.

Binder bridges between the particles and from some particles to the fiber mat have to provide a stable coated building panel. A coating mass has to be prepared by adding to the porous glass spheres at least a binder, a thickening agent and water. The mass has to be stirred and then applied to the fiber mat. Experiments showed that a combination of a silica binder and an organic polymer both with a low percentage by weight will provide optimal bridges. The preferred silica binder has to have a pH-value in the range of 8 to 10 and is a water based solution of an alkali silicate wherein the silicate is in colloidal form with a particle size in the range of 10 to 100 nm. It belongs to the group of the poly silicates. The silica binder is added in a wet form with water and solid binder each of about 50% by weight. The molecular proportion of SiO$_2$:M$_2$O is higher than 20:1. This poly silicate solution can be produced by the exchange of alkali ions by membrane electrolyses, by the treatment by zeolites or by ion exchange at H$^+$loaded cation exchangers. The stabilizing of high molecular silica is done by addition of pure alkali silicate solutions in such an amount that a molecular proportion SiO$_2$:M$_2$O of at least 20:1 is achieved. The stabilizing alkali ion can be Na$^+$ and/or K+ and/or Li$^+$ and/or NH4$^+$. A correct stabilization and a pH-value in the range of 8 to 10, preferably 9 to 10, is important.

An organic polymer, preferably styrol acrylate, is added. This polymer dispersion is added in a low amount for generating air bubbles and improving the flow qualities of the binder. Good flow qualities are important for getting the porous glass spheres in good contact with a little amount of the binder. The organic polymer is added in a wet form with water and solid binder each of about 50% by weight. The wetting and mixing of all the components of the coating mass to be applied to the fiber mat has to be done with an additional amount of water.

The high voidage of the fiber mats and of the coating material may cause production problems. The coating mass with the binder has to be liquid and building flowing films between the porous glass spheres. The spheres have to be wetted. After applying the coating mass to the upper side of a horizontally laying fiber mat the binder films have to build the binding bridges and to harden.

There are two different conditions to be fulfilled. The liquid binder mass has to have very good flow properties in order to be in contact with all the glass spheres. This easy flowing of the liquid binder and the high voidage between the glass spheres and in the fiber mat causes the liquid binder to flow through the pores between the glass spheres and into the fiber mat before the binding bridges have become hard enough to stay.

The viscosity of the liquid binder has to be low during the application of the coating mass to the fiber mat and high as soon as the coating mass is applied. The higher viscosity after coating prevents the binder from flowing through the pores between the glass spheres into the fiber mat. This changing viscosity can be achieved by adding a thickening agent which has different thickening effects on the water depending on the state of movement. As long as the coating mass is stirred and moved during application the thickening agent has to show a low viscosity. As soon as there is no more mechanically applied motion within the coating mass the viscosity has to increase. To cause this effect the thickening agent has to bind or hold more or less water—respectively liquid—depending on the state of motion of the coating mass.

The feature of variable degree of water binding can be created by thickening agents with high molecular polysaccharose. The structure of a molecule with water binding effects shows a cellulose like main chain and side chains including mannose, mannose acetate and glycuronic acid and some including pyruvic acid. In a preferred embodiment of the invention the thickening agent is xanthan. Xanthan is a natural polysaccharose which is produced by the bacterium xanthomonas campestris on cabbage plants. Xanthan produced by the bacterium binds water and protects the bacterium against drying out. Other polysaccharoses with water binding features are for example guar or carob seed grain. Xanthan shows a strong decrease in viscosity with increasing shear stress. Below a critical shear stress a xanthan solution has a high viscosity and therefore a water based binder of a coating mass with xanthan does not flow to far after the application of the coating mass to the fiber mat. The combination of a silica binder with a pH-value in the range of 8 to 10 with xanthan is favorable because xanthan's viscosity does not depend on the pH-value. Guar would have a very low viscosity at a pH of 8 to 10.

A mineral powder can be added in order to increase the stability of the bridges. The particle diameter of said mineral powder is in the range of 5 to 500 μm. Preferably Aluminum tri hydrate Al(OH)$_3$ is used because of its additional fire protective effect.

In addition to using the components listed above, it is important to choose the right portions. Table 1 shows the formulations of the coating mass and the corresponding weight percentage.

TABLE 1

| component | Amount (kg) best mode formulation | % by weight best mode formulation | Ranges (kg) of formulations | Ranges (% by weight) of formulations | Amount (kg) after drying best mode | % by weight after drying best mode |
|---|---|---|---|---|---|---|
| porous glass | 260 | 50 | 200–400 | 40–65 45–58 | 260 | 73.1 |
| mineral powder | 40 | 8 | 0–100 | 0–20 5–12 | 40 | 11.3 |
| silica binder | 80 | 15 | 40–120 | 8–30 12–18 | 40 | 11.3 |
| polymer dispersion | 30 | 6 | 5–50 | 1–10 4–8 | 15 | 4.2 |
| thickening agent Xanthan | 1 | 0.2 | 0.2–3 | 0.05–0.6 0.1–0.3 | 0.5 | 0.1 |
| water | 110 | 20.8 | 80–200 | 15–33 18–25 | | |
| total | 521 | 100 | | | 355.5 | 100 |

EXAMPLE

The porous glass sphere bulk material has a very low density and therefore one has to be aware that 260 kg is filling a space of 1 m$^3$. In respect of this volume it is very surprising that 80 kg silica binder with a water content of 50% and 30 kg polymer dispersion with a water content of 50% are sufficient for creating bridges between the porous glass spheres in such a way that a coating layer of 2 to 8 mm, preferably 3 to 6 mm, will become a stable layer after drying. In order to get a best mode coating mass 260 kg porous glass sphere bulk material, 80 kg silica binder with a water content of 50%, 30 kg polymer dispersion, 110 kg of water, 1 kg xanthan and 40 kg of mineral powder in the form of Aluminum tri hydrate $Al(OH)_3$ are mixed together. This coating mass has a consistency for application to the fiber mat.

An easy production of coated building panels uses an application station. The application station includes conveying belts for conveying fiber mats relative to an application device for applying the coating mass. The application device includes preferably a line extrusion die for applying a layer of the coating mass to the fiber mat. The thickness of this layer can be adjusted by the speed of the conveyor and by the through put of coating mass by the extrusion die. The fiber mats with the wet coating layer are transferred to a drying station where the binding bridges are emerging. After drying the total coating layer made from the coating mass of the example includes porous glass sphere bulk material of 260 kg, 40 kg silica binder without water, 15 kg solid contribution of a polymer dispersion, 1 kg xanthan and 40 kg of mineral powder. The corresponding weight percentages are for glass sphere bulk material 73,1%, for silica binder 11,3%, for a polymer binder 4,2%, for xanthan 0,1 to 0,2% and eventually for mineral powder 11,3%.

Solutions close to the best mode are still in the scope of the invention. The possible variations in the formulation are indicated by ranges in the table above. The wide ranges include solutions for special circumstances. The narrow ranges include solutions for a wide variety of situations. At a ceiling there is almost no physical impact on a building panel. Therefore the stability of the coating layer does not need to be as high as at a wall. Variations in stability can be made by adding more or less porous glass spheres in relation to the binder. The elasticity of the coating layer can be increased by increasing the polymer dispersion relative to the silica binder. Related to the higher elasticity is a reduction of fire resistance. Solutions with or without mineral powder need more respectively less binder. The amount of a thickening agent needed depends on the amount of water added. A formulation with a high water content needs a higher amount of a thickening agent. For a high porosity it might be better to have porous glass spheres of higher diameter, which varies the need for binder, water and thickening agent. Very good results are found by going close to the best mode formulation.

The production process described above is very efficient. The fiber mats with the hardened coating layer have a low weight and can be easily handled. Their resistance against damage is high due to the light weight of the coating and the strong structure of binding bridges. If the fiber mat is bent slightly the coating layer will not be destroyed, it stays on the mat. Cracks can emerge in the coating layer, but these very fine cracks are not visible. The color of the coating is given by the pleasant white color of the porous glass particles. Different colors can be achieved by adding pigments. The appearance of the coating surface is very esthetic because of its smoothness. It has the appearance of a gypsum coating.

The stable coating layer is holding on the surface of a fiber mat, preferably a mineral wool mat. The thickness of the fiber mat lies in the range of 25 to 75 mm. There are two standard thicknesses, namely 32 mm and 60 mm. The total weight of the coating layer per square meter of a coated building panel amounts to about 1.8 kg for a coating thickness of 5 mm and to about 1 kg for a coating thickness of 3 mm. The weight of a coating layer is below 0,400 kg—preferably at about 0,355 kg—per square meter and per mm of the layer thickness.

The coating layer of the inventive coated building panel has a very low weight. This low weight is due to the first empty partial volume between the porous particles and the second empty partial volume in the form of pores within the porous particles, namely the voidage. The percentage of the void volume compared to the total coating volume, respectively the percentage of air volume compared to, the coating volume, preferably lies in the range of 75 to 90%. Only 10 to 25% of the coating volume is filled by solid mineral preferably glass material, solid binder material and other solid components. More preferably, a volume percentage of a total voidage in the coating layer is in the range of 80 to 86%.% of the coating volume. In the best mode the voidage amounts to 84%. The air volume is contained in small channels or pores of the coating and causes a high resistance against heat transfer. The thermal conductivity of the dry coating amounts to about 0.07W/mK. In combination with a fiber mat of low thermal conductivity the building panel guarantees a good protection against heat transfer. In combination with the fact of using mainly non flammable material for the coating and non flammable fiber mat's, the inventive fire-mat is increasing the fire resistance of buildings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coated building panel for mounting on at least one of a wall and a ceiling of a building, comprising:
    a board element; and
    a coating layer applied to a surface of said board element, wherein said board element is a fiber mat and wherein said coating layer includes porous particles, a silica binder, an organic polymer, and a thickening agent.

2. A coated building panel as claimed in claim 1, wherein a a voidage in said coating layer lies in the range of 75 to 90%.

3. A coated building panel as claimed in claim 1, wherein a a voidage in said coating layer is in the range of 80 to 86%.

4. A coated building panel as claimed in claim 1, wherein said porous particles are porous glass spheres produced by a blowing process from glass powder, water, binder and a blowing agent.

5. A coated building panel as claimed in claim 1, wherein said porous particles are Tobermorit ($5CaO\ 6SiO_2\ 5\ H_2O$) particles.

6. A coated building panel as claimed in claim 1, wherein said porous particles include diameters in the range of 0,5 to 1 mm, a bulk density of a granulate of said porous particles lies in the range of 200 to 300 kg/m$^3$, thermal conductivity of said granulate lies in the range of 0.05 to 0.09W/mK and wherein said particles are alkali-proof.

7. A coated building panel as claimed in claim 1, wherein said coating layer includes a thickness of 2 to 8 mm.

8. A coated building panel as claimed in claim 1, wherein said coating layer includes a thickness of 3 to 6 mm.

9. A coated building panel as claimed in claim 1, wherein a total weight per square meter and per mm of the coating layer is below 0,400 kg.

10. A coated building panel as claimed in claim 1, wherein a total weight per square meter and per mm of the coating layer lies at about 0,355 kg.

11. A coated building panel as claimed in claim 1, wherein a thickness of said fiber mat lies in the range of 25 to 75 mm.

12. A coated building panel as claimed in claim 1, wherein a thickness of said fiber mat amounts to about 32 mm.

13. A coated building panel as claimed in claim 1, wherein a thickness of said fiber mat amounts to about 60 mm.

14. A coated building panel as claimed in claim 1, wherein said silica binder, when added to a coating mass which will be applied to said fiber mat, belongs to the group of the poly silicates, includes a pH-value in the range of 8 to 10 and is a water based solution of an alkali silicate wherein the silicate is in colloidal form with a particle size in the range of 10 to 100 nm.

15. A coated building panel as claimed in claim 1, wherein the molecular proportion of $SiO_2:M_2O$ is higher then 20:1 and wherein M is an alkali ion selected from the group consisting of $Na^+$, $K^+$, $Li^+$ and $NH4^+$.

16. A coated building panel as claimed in claim 1, wherein said organic polymer is a styrol acrylate.

17. A coated building panel as claimed in claim 1, wherein said thickening agent is a high molecular polysaccharose with a cellulose type main chain and side chains including mannose, mannose acetate and glycuronic acid and at least one side chain including pyruvic acid.

18. A coated building panel as claimed in claim 1, wherein said thickening agent is xanthan a natural polysaccharose which is produced by the bacterium xanthomonas campestris on cabbage plants.

19. A coated building panel as claimed in claim 1, further comprising mineral powder with particle diameters of said mineral powder in the range of 5 to 500 μm.

20. A coated building panel as claimed in claim 19, wherein said mineral powder is Aluminum tri hydrate $Al(OH)_3$.

21. A coated building panel as claimed in claim 1, wherein the components of said coating layer after drying include the following weight percentages, porous glass spheres 68 to 80%, mineral powder 0 to 15%, silica binder 9 to 14% and organic polymer 2 to 6%.

22. A coated building panel as claimed in claim 1, wherein the components of said coating layer after drying include the following weight percentages, porous glass spheres 73,1%, mineral powder 11,3%, silica binder 11,3% and organic polymer 4,2%.

23. A method for producing a coated building panel, comprising the steps of:
    preparing a coating mass by mixing porous particle bulk material, silica binder, polymer dispersion, water and xanthan;
    applying the coating mass to a fiber mat; and
    drying the coated fiber mat.

24. A method as claimed in claim 23, further comprising the step of adding a mineral powder in the form of aluminum tri hydrate $Al(OH)_3$ to the coating mass.

25. A method as claimed in claim 23, wherein for applying the coating mass, fiber mats are conveyed by a conveying device relative to an application device for applying the coating mass, and wherein the coating mass is applied by a line extrusion die.

* * * * *